(12) United States Patent
Plews

(10) Patent No.: US 8,863,597 B2
(45) Date of Patent: Oct. 21, 2014

(54) STARDRIVE PROPULSION SYSTEM

(76) Inventor: Dennis J. Plews, Sarasota, FL (US)

( * ) Notice: Subject to any disclaimer, the term of this patent is extended or adjusted under 35 U.S.C. 154(b) by 1352 days.

(21) Appl. No.: 11/514,405

(22) Filed: Aug. 30, 2006

(65) Prior Publication Data

US 2008/0121071 A1    May 29, 2008

(51) Int. Cl.
*F03G 3/00*    (2006.01)
(52) U.S. Cl.
CPC ...................................... *F03G 3/00* (2013.01)
USPC ......................................................... 74/84 S
(58) Field of Classification Search
CPC ......................................................... F03G 3/00
USPC ......................................................... 74/84 S
See application file for complete search history.

(56) References Cited

U.S. PATENT DOCUMENTS

| | | | |
|---|---|---|---|
| 2,009,780 A | 7/1935 | Laskowitz | |
| 3,584,515 A | 6/1971 | Matyas | |
| 3,807,244 A | 4/1974 | Estrade | |
| 3,935,752 A | 2/1976 | Kelbel et al. | |
| 3,968,700 A | 7/1976 | Cuff | |
| 3,998,107 A | 12/1976 | Cuff | |
| 5,269,201 A | 12/1993 | Uematsu | |
| 5,747,801 A | 5/1998 | Quarmby et al. | |
| 5,809,835 A | 9/1998 | Beim et al. | |
| 6,336,372 B1 | 1/2002 | Ogami et al. | |
| 6,374,686 B1 | 4/2002 | Weston | |
| 6,375,592 B1 | 4/2002 | Takahashi et al. | |
| 6,375,594 B1 | 4/2002 | Wafzig | |
| 2006/0005644 A1* | 1/2006 | Weaver | 74/84 S |
| 2006/0213293 A1* | 9/2006 | Lasch et al. | 74/84 S |
| 2007/0295164 A1* | 12/2007 | Tavarez | 74/84 S |

FOREIGN PATENT DOCUMENTS

FR          86402          12/1962

OTHER PUBLICATIONS

Philip Yam, Bringing Shrodinger's Cat to Life, Trends in Physics, Scientific American Jun. 1997.
Gary Taubes, Schizophrenic Atom Doubles As Schrodinger's Cat-or Kitten, Science, vol. 272, May 24, 1996.
Jeffers, S.R., Monroe, C., Bell, E.W., Wineland, D.J., Coaxial-resonator driven rf (Paul) trap for strong confinement, Physical Review, vol. 51, No. 4, Apr. 1995.
Monroe, C., Meekhof, D.M., King, B.E., Jefferts, S.R., Itano, W.M., Wineland, D.J., Resolved-Sideband Raman Cooling of a Bound Atom to the 3D Zero Point Energy; Physical Review.

* cited by examiner

*Primary Examiner* — Troy Chambers
*Assistant Examiner* — Terence Boes
(74) *Attorney, Agent, or Firm* — GrayRobinson, P.A.; Michael J. Colitz, III

(57) ABSTRACT

A device that produces linear motion by sequentially and in a continuous sequence accelerating inertial thrust masses at well defined times towards the axis of counter-rotating disks. The inertial thrust masses are contained in cavities placed equidistantly about the periphery of counter rotating capture disks mounted on a common axle. They are radially accelerated by a bi-directional impulse ramps that can be moved to any position around the periphery of the counter rotating capture plates and into and out of the paths of the gyrating thrust masses to any desired depth within the mechanical range of the impulse ramps which simultaneously engage and radially accelerate the inertial thrust masses of each counter-rotating capture plate. The counter-rotating capture plates are each separately driven by a gear assembly powered by an external engine or motor that powers the rotation of the disks. Each radial acceleration of the inertial thrust masses produces an impulse of force that pushes against the mass accelerator with a force equal to the force used to radially accelerate each thrust mass. Each impulse is a vector force and imparts motion along the chosen vector to any object to which the device is attached.

16 Claims, 6 Drawing Sheets

STARDRIVE PROPULSION SYSTEM

BACKGROUND OF THE INVENTION

1. Field of Invention

The present invention relates to an impulse device and more particularly pertains to mounting freely movable masses about the periphery of counter rotating circular capture plates which are in turn mounted onto a main rotational axis drive shaft, whereby energy is provided to cause the circular capture plates to counter rotate, while having the ability to move the freely movable masses radially toward and away from the axis of rotation. The invention further relates to a new method of converting rotational energy, as generated by an engine or motor, into linear motion.

2. Description of the Related Art

Current terrestrial transportation technologies use a variety of mechanisms to convert the rotational energy generated by the engine or motor contained within the vehicle into the linear motion of the vehicle. In the automotive world there are three basic forms of the mechanical device generally known as a transmission that is connected to the motor/engine and in turn itself is connected to a drive shaft and gear assembly that ultimately attaches to the drive wheel(s) (the drive train) to produce the motion of the vehicle. The three basic varieties of an automotive transmission are manual, automatic and continuously variable, with the manual transmission generally being the most efficient form for transmitting the motor/engine power to the drive wheel(s).

In aircraft the choices for converting engine power output into vehicle motion are propellers and jet engine thrust from jet engines such as turbofan engines or turbojet engines. Aircraft propeller efficiency varies according to the shape of the propeller and the angle of incidence of the propeller. In every case the amount of energy used to spin the propeller is significantly greater than the amount of thrust produced. Jet engine efficiency similarly suffers losses between the input of the fuel's energy and the output of the thrust energy. Moreover, propeller aircraft suffer significant efficiency losses as altitude increases.

Marine propellers have thrust to input power ratios similar to aircraft propellers with the additional problem of corrosion and encrustation thrust losses not suffered by aircraft propellers.

Accordingly, there existed a need for a highly efficient device that would solve the problems of fuel inefficiency, excess energy consumption and reduce friction wear of operable parts. In this regard, the present invention substantially fulfills this need.

Prior patented devices have exploited the relationship between the radius of the gyration of movable weights, the centripetal force required to maintain a constant radius of the gyration of movable weights and the effect that varying the radius has on the overall energy balance of the system. By way of example, the prior art includes U.S. Pat. No. 3,968,700. In U.S. Pat. No. 3,968,700 the inventor in his abstract stated that his device " . . . relates to new and useful improvements in devices that convert the centrifugal forces produced by rotating masses into a propulsive force acting in one direction and which is comprised of a movable supporting structure in which identical sets of masses rotate in opposite directions about an axis which is perpendicular to the desired direction of travel and a mechanism for continuously varying the radius of gyration of each mass during its cycle of revolution." The method employed in the device of the '700 patent to create and exploit differential centripetal accelerations and convert that difference into a linear force was to have two circular aspects of that device which had their respective centers offset slightly, one circular aspect being comprised of a bearing race and the other circular aspect consisting of an assembly having an axis that has radial arms extending from it and onto which radial arms are mounted masses that can move radially toward and away from the axis along the radial arms. Since in that device the bearing race center is offset from the radial arm center of rotation, when the movable masses gyrated about the offset circular bearing race, the angular velocity, and hence the centripetal acceleration, varied with the difference in those two values, resulting in a produced linear thrust vector. Further, the device in U.S. Pat. No. 3,584,515 similarly exploited the forces generated by varying the radius of a circle around which rotating masses were constrained to take. In U.S. Pat. No. 3,998,107 the same concept of varying the radius of the circle about which masses are rotated to produce a difference from one point to another of the amount of centripetal force generated is also exploited. In the device of the '107 patent, the entire inner housing which contained the movable thrust masses, the cylinders in which the movable masses were contained and the associated connecting rods were caused to rotate about a stationary, crank like shaft that itself could be moved to vary the direction of the resulting centripetal acceleration difference that was induced by varying the radius of gyration. It could not change the magnitude of the resulting thrust vector other than by changing the velocity of gyration. In these cases the direction of the desired thrust vector is fixed by the particular design of the device, or the thrust vector magnitude is limited, or both.

U.S. Pat. No. 3,807,244 and U.S. Pat. No. 2,009,780 are other examples of such devices. In the patents discussed above the direction of the desired thrust vector is fixed by the particular design of the device, or the thrust vector magnitude is limited, or both.

Therefore, it can be appreciated that there exists a continuing need for a new and improved device which can be used to exploit the relationship between the radius of the gyration of movable weights, the centripetal force required to maintain a constant radius of the gyration of movable weights and the effect that varying the radius has on the overall energy balance of the system, without limiting or fixing the directional movement of the thrust vector to the design of the device.

BRIEF SUMMARY OF THE INVENTION

After extensive study of various inertial systems, the present inventor discovered that conventional means of converting the input energy of an engine or motor into thrust that propelled a vehicle could be eliminated. Specifically, it is the object of the present invention to provide a more useful alternative to automotive transmissions and drive trains, aeronautical and marine propellers and for on orbit uses, a more useful alternative to reaction wheels, ion and chemical thrusters.

Accordingly, a primary purpose of the propulsion drive is to use a movable ramp to sequentially and in a continuous sequence accelerate the gyrating inertial thrust masses towards the axis of the counter-rotating disks and thereby translate kinetic energy to the device. Basically, the device exploits the inertial mass and rotational energy of the radially freely movable masses and generates linear motion of the entire device and any object to which the device is affixed. As such, the general purpose of the present invention is to make things move in any desired direction via the reaction force applied to the acceleration ramps and translated to the impulse drive plate, which is attached to a vehicle, with the direction of movement determined by the direction of the impulse body control arm which is under the control of the vehicle's operator.

To attain the linear motion of the device, the present invention essentially comprises an arrangement of freely movable inertial thrust masses that are constrained to move in a circle at high speeds but which also have the ability to freely move radially toward and away from the axis of rotation. The movement of these masses toward the rotational axis is induced mechanically through ramps that increase the inertial thrust mass's centripetal acceleration at sites about the circumference of the circle about which the movable inertial thrust masses are spun. This induced asymmetrical additional centripetal acceleration, by the operation of Newton's Third Law of motion, produces an oppositely directed reaction force in the device, which is the source of the desired thrust. The counter-rotating capture plates and inertia thrust masses negate imparting any angular momentum to the device. The number of the movable masses, elsewhere referred to herein as inertial thrust masses, and the number of impulse ramps or other similarly functioning devices, as well as the size of the circle about which the inertial thrust masses move and the speed of rotation, can be varied to fit the specific application under contemplation. As the invention is mechanical in nature, a conventional oiling system is required, as well as an enclosing shell that protects the moving parts from contamination and collects and reuses the oil.

Energy to rotate the movable inertial thrust masses and actuate the impulse ramps is externally supplied, thus complying with the conservation of energy laws. The bi-directional impulse ramps are powered externally or internally by commercially available electric motors. In the version described herein it is contemplated that a single, external source us used to provide all needed power to the invention's counter rotating drive discs. The mass impulse ramps can be controlled to fit the performance needs of the operator. Since the inertial thrust mass impulse ramps may be positioned anywhere to intercept the motion of the thrust masses about the periphery of their circular motion, the thrust vector produced can be varied at the direction of the operator. Since there are few moving parts that move against other component parts, friction is minimized. As the thrust that is produced by the invention can cause any device to which the invention is attached to move, and the inherent inefficiencies of automotive drive trains and propellers are avoided. Since the inertial thrust masses are continuously reused, the device does not run out of propellant as is the case with ion or chemical thrusters.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the Figures. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is therefore an object of the present invention to reduce power loss and increase energy efficiency when converting the energy generated by the engine/motor into linear motion.

It is an object of the present invention to provide an impulse drive that may be easily and efficiently manufactured and marketed.

A further object of the present invention to provide environmental benefits resulting from increased energy efficiency in the transportation industry.

Another object of the present invention is to provide economic benefits resulting from the reduced cost of production of the invention as compared to the cost of the production of automotive drive trains.

A further object of the invention is operator control of the device for control of the direction and magnitude of the induced linear thrust vector.

Still another object of the invention is to use movable bi-directional acceleration ramps to change the length of the radius of the circle followed by the inertial thrust masses at one or more locations around the circumference of the circular path followed by the inertial thrust masses, such that when the acceleration ramps are moved into the paths of the gyrating inertial thrust masses, the length of the radius of the circle being followed by the inertial thrust masses is shortened.

A further object of the invention is to increase the centripetal force generated in the device as the speed of gyration of the thrust masses remains unchanged even with the change in the length of the radius of the circle being followed by the inertial thrust masses when the movable bi-directional acceleration ramps is moved into the path of the gyrating inertial thrust masses.

Another application of the device is in space. Current space craft, including commercial satellites, use chemical rockets for propulsion or ion propulsion (one U.S.A. ion propulsion craft has been successful as of the date hereof, the Deep Space One). Since the fuel of the rocket is also the reaction mass which is consumed by the process of generating thrust, once the fuel is exhausted the useful life of the satellite or space craft is ended. The present invention has no such limitation as the reaction mass of the invention consists of the freely movable thrust masses which are retained and reused. So long as a power supply such as solar panels or radioisotope thermoelectric generators (RTGs) can provide electrical energy to a motor to power the invention, thrust is available to stabilize satellites in orbit or to propel space craft as needed or desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying Figure and descriptive matter in which there is illustrated one of the embodiments of the invention.

BRIEF DESCRIPTION OF THE DRAWINGS

The invention will be better understood and objects other than those set forth above will become apparent when consideration is give to the following detailed description thereof. Such description makes reference to the annexed drawings wherein.

Similar reference characters refer to similar parts through the several views of the drawings.

DETAILED DESCRIPTION OF THE INVENTION

Figure 1:
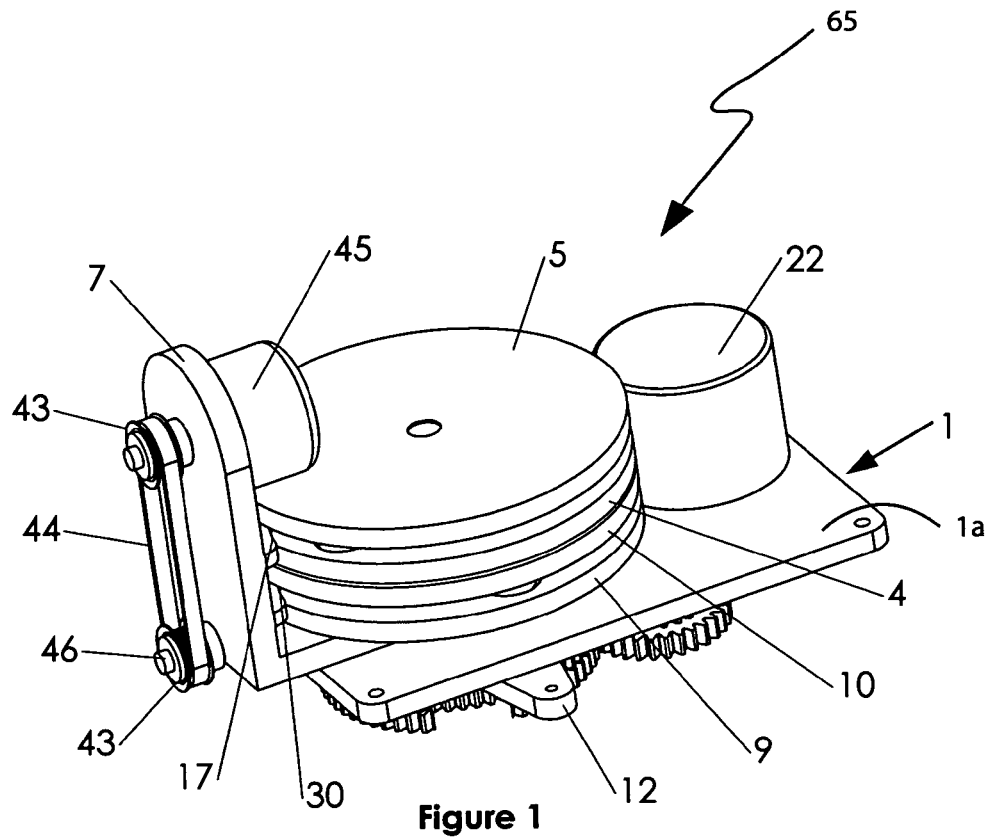
FIG. 1 is an upper perspective illustration of the preferred embodiment of the stardrive propulsion system constructed in accordance with the principles of the present invention.
Figure 2:
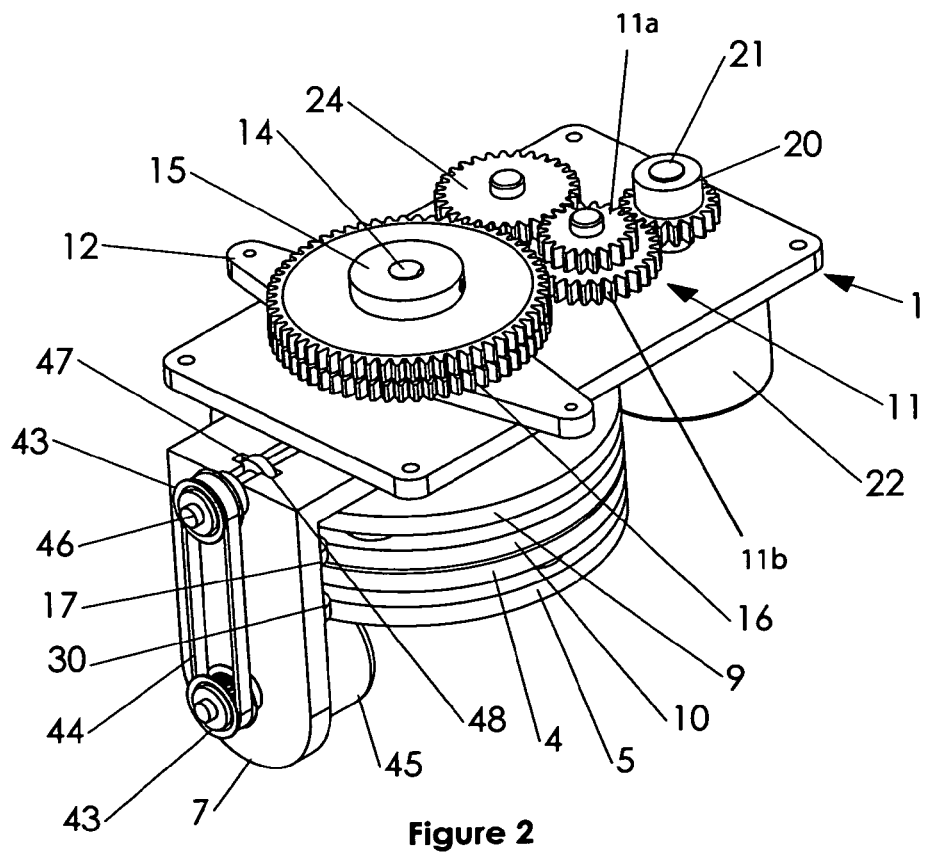
FIG. 2 is a lower perspective illustration of the preferred embodiment of the stardrive propulsion system constructed in accordance with the principles of the present invention.

With reference now to the drawings, and in particular to FIGS. 1 and 2 thereof, a stardrive propulsion system embodying the principles and concepts of the present invention and generally designated by the reference numeral 65 will be described.

The present invention, stardrive propulsion system, is comprised of a plurality of components. Such components in their broadest context include an impulse body, impulse ramps, a ramp position motor, impulse drive plate, an upper and lower counter-clockwise capture plates, an upper and lower clockwise capture plates, inertial thrust masses and a motor. Such components are individually configured and correlated with respect to each other so as to attain the desired objective.

More specifically, the present invention includes a propulsion device for creating linear motion by applying a fixed mechanical interference, the impulse ramps, to absorb a portion of the kinetic energy as the momentum of rotating inertial thrust masses is diverted by the fixed mechanical interference, within a closed system. The device includes a plurality of capture plates 9, 10, 14 and 15. The capture plates have a plurality of capture slots 19 that are equidistantly spaced about the periphery of each of respective the capture plates. The plurality of capture plates includes a pair of counter-clockwise rotating capture plates and a pair of clockwise rotating capture plates. The pair of counter-clockwise capture plates are made by a lower counter-clockwise capture plate 4 and an upper counter-clockwise capture plate 5. The pair of clockwise capture plates are made by a lower clockwise capture plate 10 and an upper clockwise capture plate 9.

Also, a plurality of capture plate gears is included. The plurality of capture plate gears includes a motor drive gear 20, a tandem intermediate drive gear 11, a tandem reversing gear 24, a clockwise capture plate gear 16, and counter-clockwise capture plate gear 15. The tandem intermediate drive gear has an upper gear part 11a and a lower gear part 11b. The upper gear part meshes with the tandem reversing gear which meshes with the counter-clockwise capture plate gear which is connected to one of the pair of capture plate shafts for rotation of the lower counter-clockwise capture plate and the upper counter-clockwise capture plate. The lower gear part meshes with clockwise capture plate gear which is connected to another of the pair of capture plate shafts for rotation of the lower clockwise capture plate and the upper clockwise capture plate.

The plurality of capture plates and the plurality of capture plate gears are mounted to an impulse drive plate 1. The impulse drive plate has a first side 1a and a second side 1b, with the plurality of capture plates being mounted on the first side of the impulse drive plate and the plurality of capture plate gears being mounted to the second side of the impulse drive plate. The plurality of capture plates are in rotational communication with the plurality of capture plate gears by way of a pair of co-axial capture plate shafts. The pair of capture plate shafts includes a counter-clockwise capture plate shaft 14 and a clockwise capture plate shaft 13.

Further, a plurality of inertial thrust masses are positioned within corresponding capture slots of the plurality of capture plates. In this embodiment of the device the upper and lower counter-clockwise capture plates have at least three inertial thrust masses 2 positioned with capture slots. The upper and lower clockwise capture have at least three inertial thrust masses 3 positioned with capture slots. The inertial thrust masses move freely within the capture slots.

An impulse body 7 is mounted to the first side of the impulse drive plate and is spaced from the plurality of capture plates. The impulse body has a plurality of impulse ramps 17 and 30. The impulse ramps are sized to be placed between the plurality of capture plates for engagement of the plurality of inertia thrust masses positioned within the capture slots of the capture plates. Additionally, the impulse body includes two pulleys 43. One of the pulleys is connected to a ramp position motor drive shaft 45a and the other pulley is connected to a ramp position screw shaft 46. A drive belt 44 is used to transfer rotational motion from the one pulley connected to the ramp position motor drive shaft to the other pulley connected to the ramp position screw shaft. A ramp position motor 45 is connected to the ramp position motor drive shaft and mounted on the impulse body. The rotational motion generated by the ramp position motor will cause the ramp position screw 50 to be driven fore and aft for movement of the impulse body and thereby changing the position of the impulse ramps between the plurality of capture plates.

In this embodiment of the device a motor 22 is mounted to the impulse drive plate. The motor receives its power from the vehicle in which the impulse drive plate is mounted thereon. Once the motor is activated, the plurality of capture plate gears is rotated and will in turn rotate the plurality of capture plate shafts. The rotation of the two capture plate shafts causes rotation of the capture plates for clockwise and counter-clockwise rotation of the plurality of inertial thrust masses within the capture slots with the rotating plurality of inertial thrust masses making contact with the impulse ramps. The force that is transmitted to the impulse drive plate is caused by the radial acceleration of the inertial thrust masses by the impulse ramps and causes movement in the direction determined by the movement of an impulse body control arm which is under the control of the vehicle's operator. Simply stated, energy is transferred to the impulse body 7 from the acceleration of the inertial thrust masses 2 and 3 when they pass over and are radially accelerated by their respective impulse ramp, and is transferred to impulse drive plate 1.

For the purposes of this application vehicle is defined as any man made means of transportation that is mechanized.

Referring to FIGS. 1 and 2, Impulse drive plate 1 is the mechanism mounting substrate. Motor 22 is connected to Impulse drive plate 1 and provides rotation power (Referring FIGS. 3 & 4) through motor drive shaft 21, resulting in the clockwise rotation of motor drive gear 20. Motor Drive gear 20 meshes with tandem intermediate drive gear 11. The tandem intermediate drive gear 11 is a single part that has a upper gear part 11a and a lower gear part 11b. The upper gear part 11a of tandem intermediate drive gear 11 meshes with tandem reversing gear 24. The lower gear part 11b of tandem intermediate drive gear 11 meshes with clockwise capture plate gear 16. Tandem reversing gear 24 meshes with counter-clockwise capture plate gear 15. Counter-clockwise capture plate gear 15 is an all in one piece gear and hub that is either built as a one piece or pressed together by glue or other means to be one piece. The rotation of lower counter-clockwise capture plate 4 and upper counter-clockwise capture plate 5 is driven by means of counter-clockwise capture plate shaft 14 connected to counter-clockwise capture plate gear 15. The rotation of lower clockwise capture plate 9 and upper clockwise capture plate 10 is driven by means of clockwise capture plate shaft 13, connected to clockwise capture plate gear 16. Clockwise capture plate shaft 13 is coaxial to counter-clockwise capture plate shaft 14. As motor 22 applies rotational power to the system, inertia thrust masses 3 move in opposite centrifugal orbits relative to inertia thrust masses 2.

Figure 6:
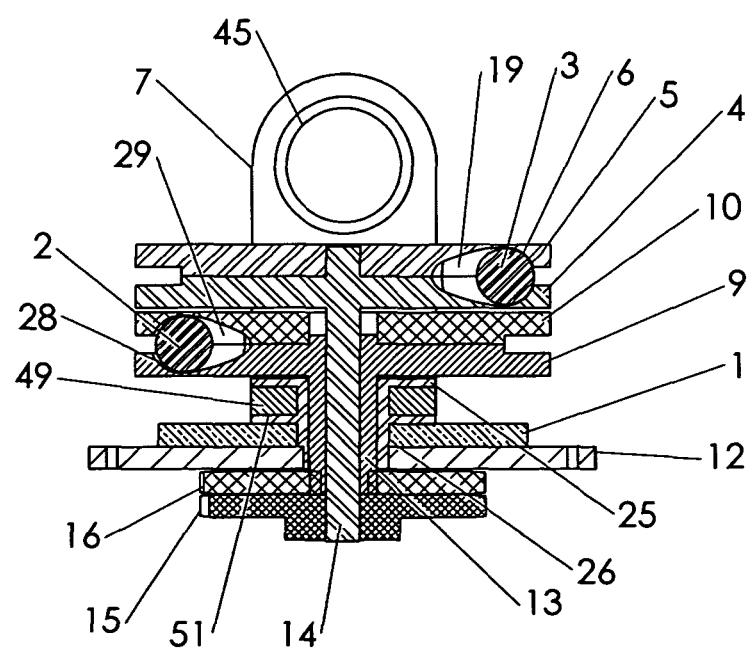
FIG. 6 is a sectional view taken along lines 6-6 of FIG. 5.
Figure 5A:
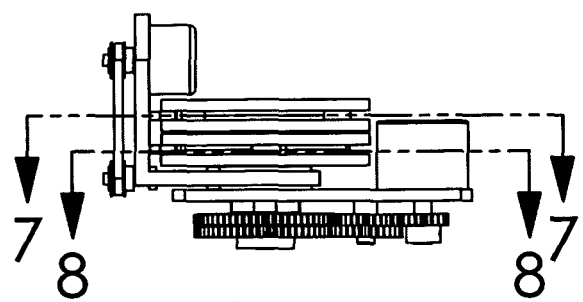
FIG. 5A is a secondary right side view of the present invention.
Figure 7:
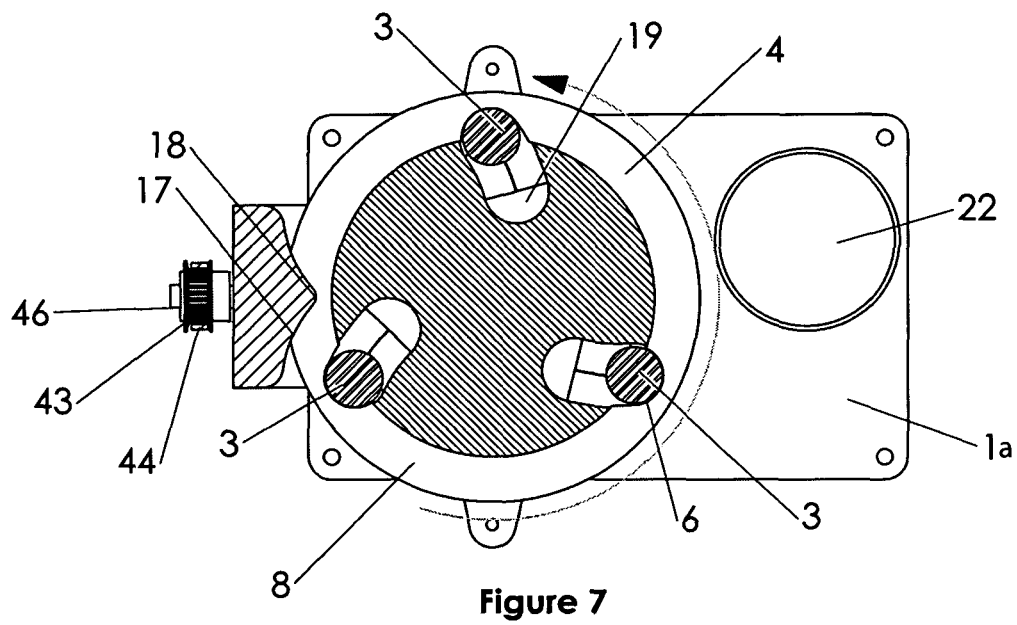
FIG. 7 is a sectional view taken along lines 7-7 of FIG. 5A to show the area below upper capture plate 5.

Referring to FIG. 7, a plurality of inertia thrust masses 3 is captured in capture slot 19 formed by lower counter-clockwise capture plate 4 and upper counter-clockwise capture plate 5 as shown on FIG. 6. This plurality of inertia thrust masses 3 are equally spaced along centrifugal path 41 as shown on FIG. 10, at a velocity and counter-clockwise rotation that causes these masses to be thrown to the outside limits of capture slot 19 by centrifugal force. Inertia thrust mass 3 centrifugal diversion is limited by mass retainer surface 6, located on the distal end of capture slot 19. A portion of inertia thrust mass 3 is allowed by mass retainer surface 6 to extend into upper impulse ramp slot 8.

Figure 8:
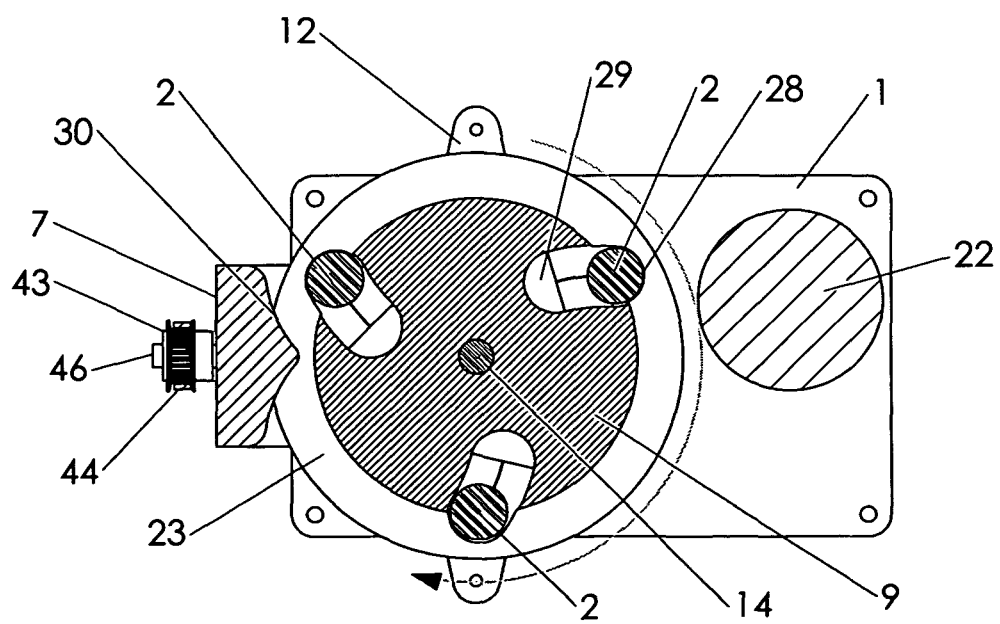
FIG. 8 is a sectional view taken along lines 8-8 of FIG. 5A to show the area below the upper clockwise capture plate 10.

Referring to FIG. 8, a plurality of inertia thrust masses 2 is captured in capture slot 19 formed by lower clockwise capture plate 9 and upper clockwise capture plate 10, as shown on FIG. 6. This plurality of inertia thrust masses 2 are equally spaced along centrifugal path 41 as shown on FIG. 10, at a velocity and clockwise rotation that causes these masses to be thrown to the outside limits of capture slot 29 by centrifugal force. Inertia thrust mass 2 centrifugal diversion is limited by mass retainer surface 28, located on the distal end of capture slot 29. A portion of inertia thrust mass 2 is allowed by mass retainer surface 28 to extend into Lower impulse ramp slot 23.

Figure 10:
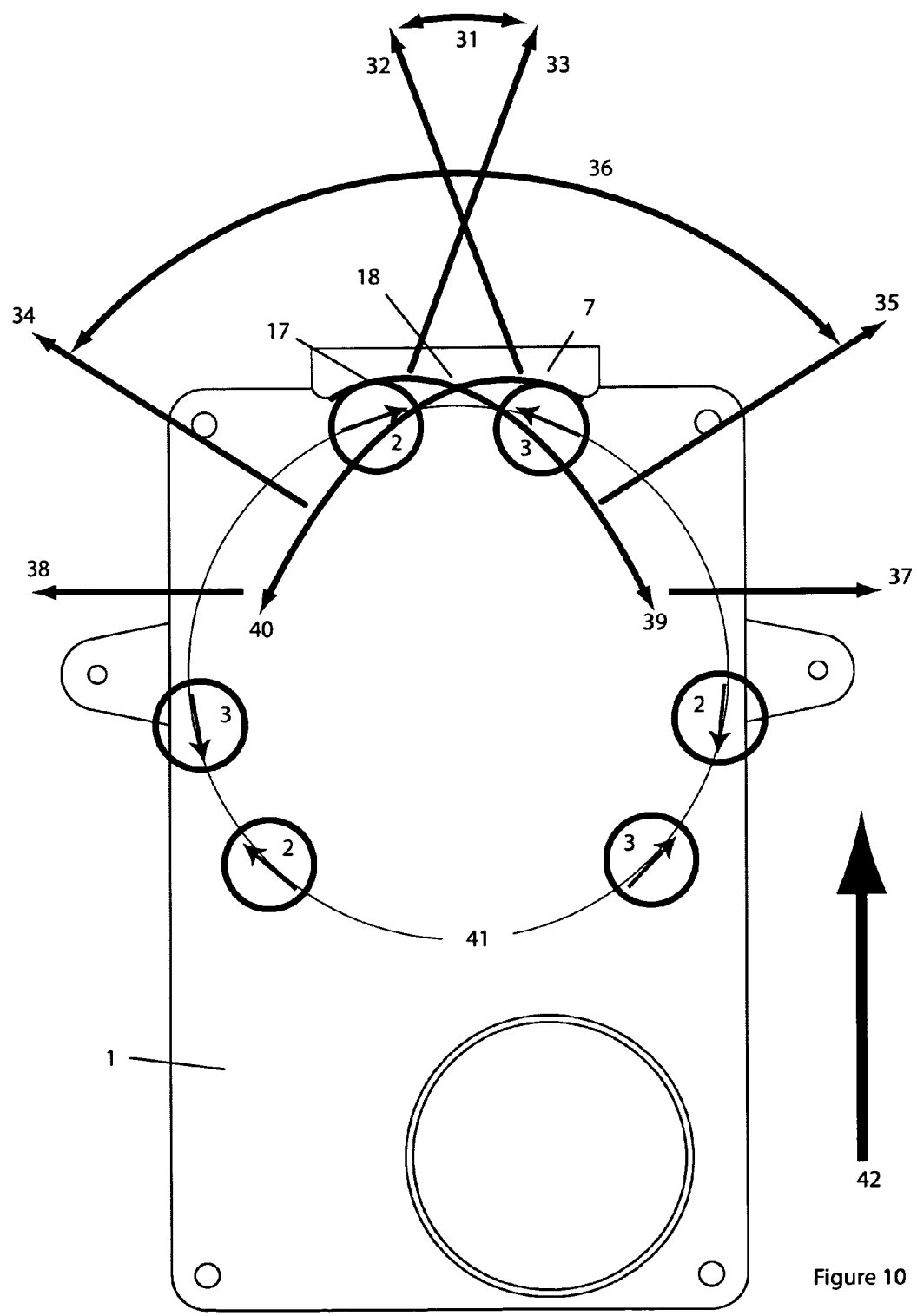
FIG. 10 is a perspective view illustration the vectors of motion of the present invention.

Referring to FIG. 10, as inertia thrust mass 2 and inertia thrust mass 3 contacts impulse body 7, the direction of the masses is diverted by impulse ramp 17 and 30, inducing forces by causing resultant vector 32 and resultant vector 33 in vector convergence zone 31 to converge. The impulse vector is collinear as inertia thrust mass 2 and inertia thrust mass 3 reach impulse apex 18. This creates the maximum force to impulse drive plate 1, by means of impulse translation from impulse apex 18 into the impulse body 7 as shown in FIG. 4, and through impulse body bushing 25, through impulse drive plate 1, causing an induced motion vector 42.

Referring to FIG. 10, as inertia thrust mass 2 and inertial thrust mass 3 pass impulse apex 18, the force of the masses continues as two opposing and divergent vectors 34 and 35 in vector divergent zone 36 on an Inertial thrust mass path 39 and 40, as defined by the angle of inertial thrust mass 2 and inertial thrust mass 3. Referring to FIG. 6, inertial thrust mass 2 and inertial thrust mass 3 is recaptured by capture slot 29 and capture slot 19. The recapture vector 37 and 38 forces cancel, and do not cause any reactive force to be applied to induced motion vector 42.

Figure 4:
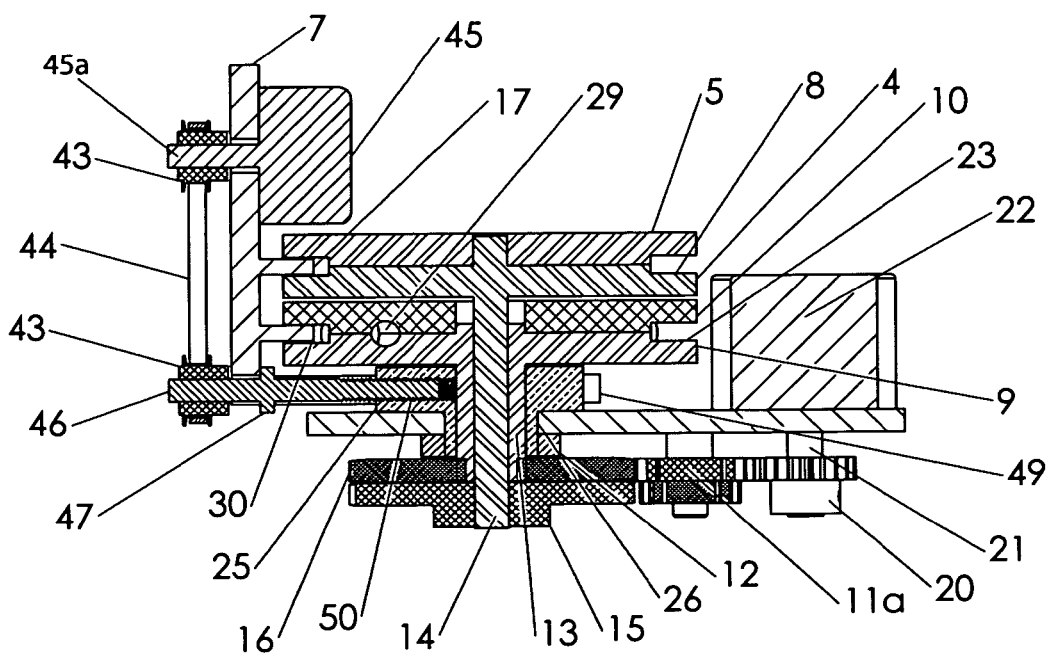
FIG. 4 is a cross-sectional view taken along lines 4-4 of FIG. 3.
Figure 5:
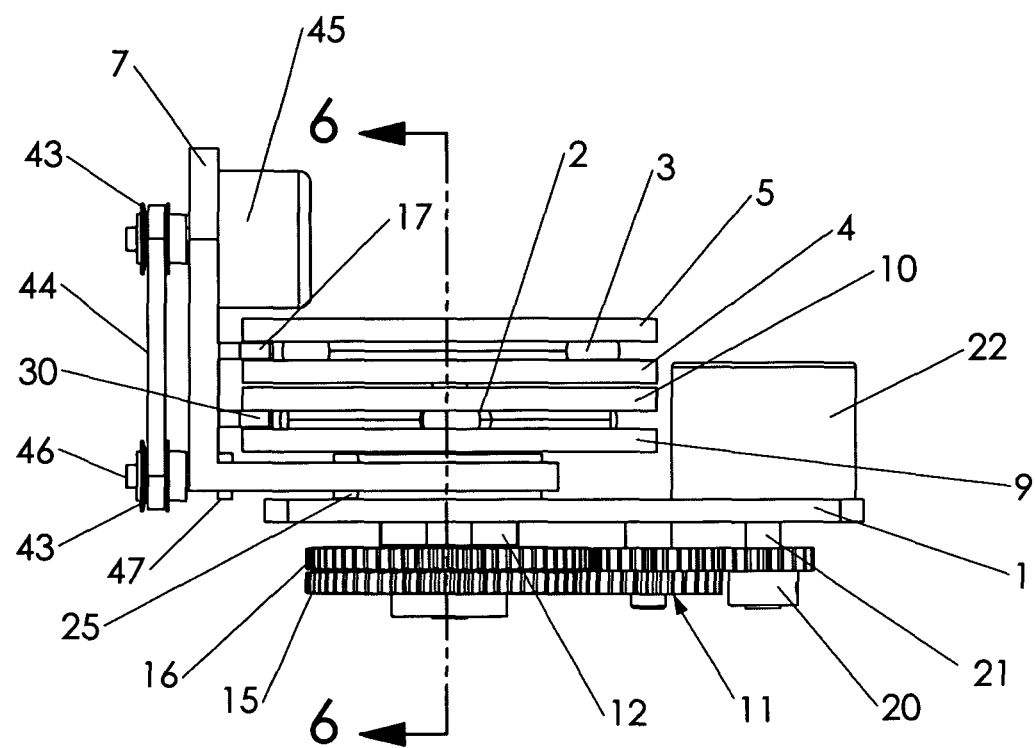
FIG. 5 is a right side view of the present invention of FIG. 1.

Referring to FIG. 4, the force can be regulated by the contact of inertial thrust mass 2 and inertial thrust mass 3 relative to the position of impulse ramp 17 and 30, by increasing or decreasing the diverted path of these inertial thrust masses. The impulse ramps 17 and 30 act as fixed mechanical interferences that translate energy to impulse drive plate 1 by absorbing a portion of the kinetic energy as the momentum of the inertial thrust masses 2 and 3 is diverted by the impulse ramps. This is done by moving the position of Impulse body 7, thereby positioning the impulse ramp 17 and 30 in lower impulse ramp slot 23 and upper impulse ramp slot 8, relative to the center or rotation of the inertial thrust masses. Ramp position motor 45 drives and power transmission assembly composed of two pulleys 43 and drive belt 44 to transfer rotational motion to ramp position screw shaft 46. The ramp position motor is connected to a control system within the vehicle that can be manually or remotely operated. Specifically, one of the pulleys is connected to a ramp position motor drive shaft 45a and the other pulley is connected to ramp position screw shaft 46. The drive belt 44 is used to transfer rotational motion from the one pulley connected to the ramp position motor drive shaft to the other pulley connected to the ramp position screw shaft 46. This motion allows ramp position screw 50 to be driven fore and aft, relative to the center or rotation of the inertial thrust masses, by means of impulse body bushing 25.

Figure 3:
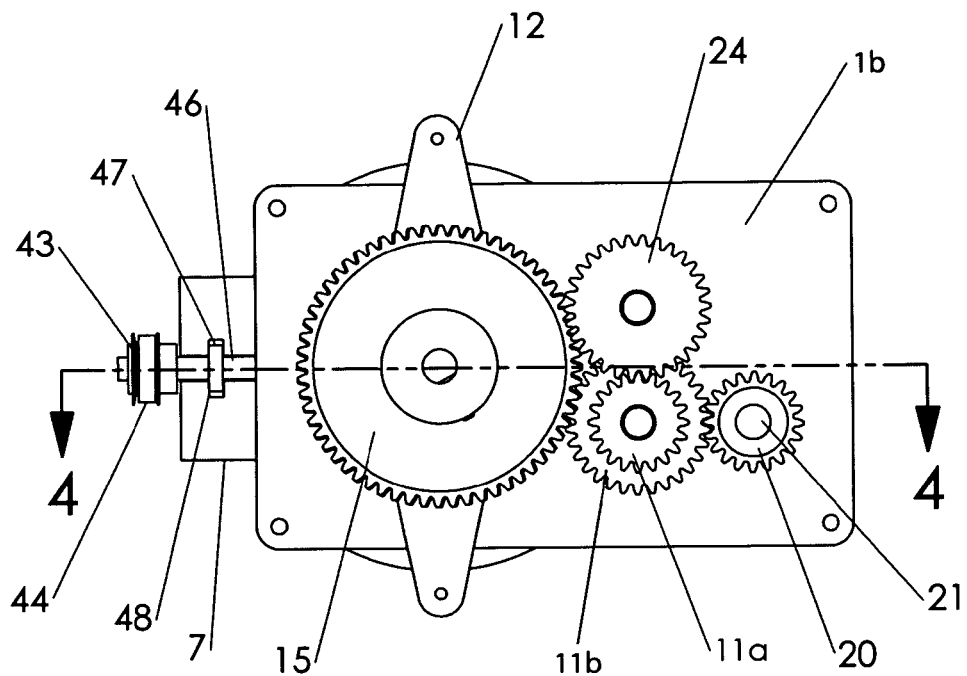
FIG. 3 is a plan view of the lower side of the present invention.

Referring to FIG. 3, ramp position screw shaft 46 is retained in impulse body 7 by ramp shaft retainer 47, captured in ramp shaft retainer slot 48. Referring to FIG. 6, impulse body 7 is held in place and slides fore and aft relative to the center or rotation of the inertial thrust masses, by means of impulse body forks 49 captured by impulse body retaining slot 51, located in impulse body bushing 25.

Figure 9:
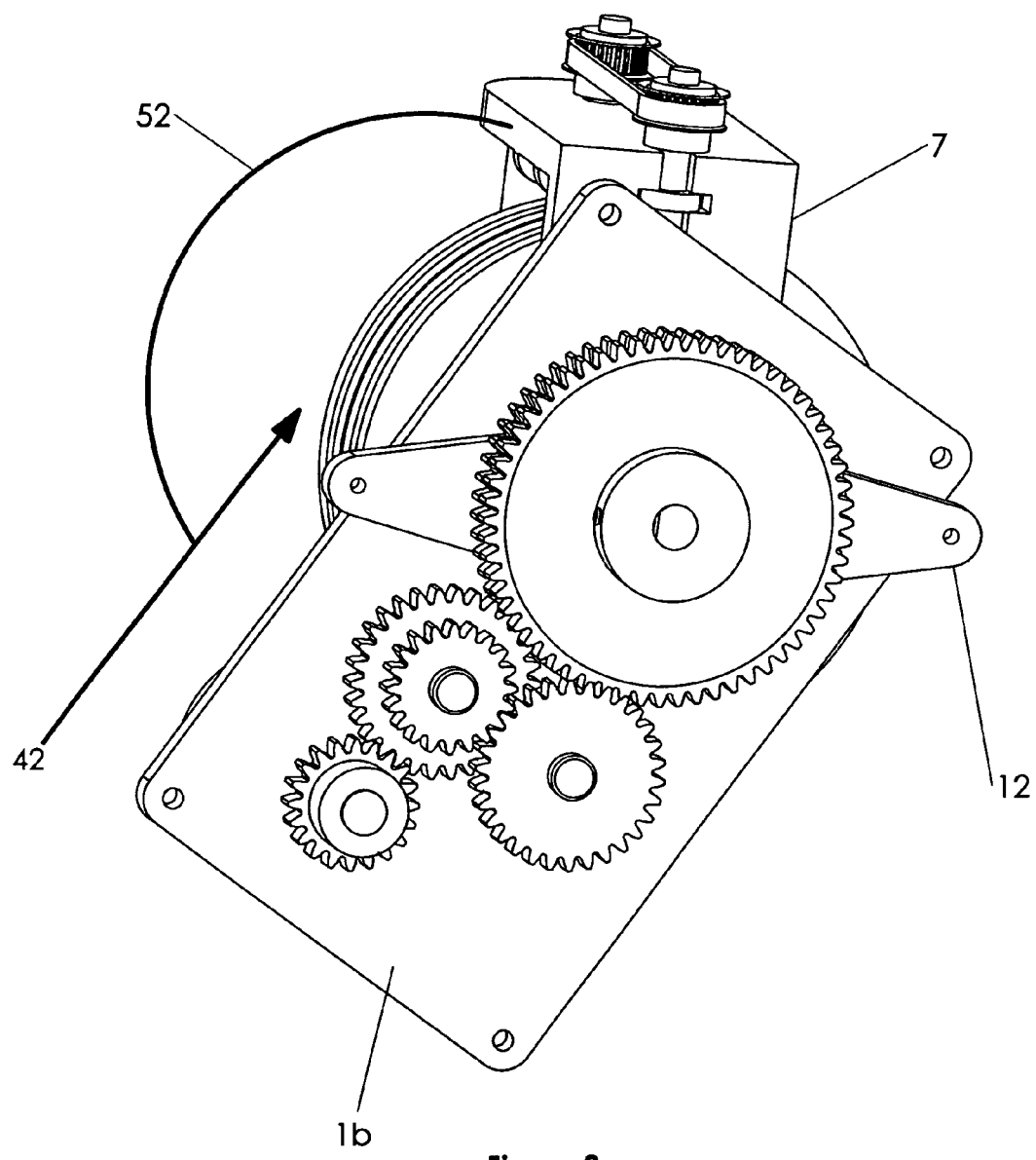
FIG. 9 is an elevational view of the present invention showing the lower side.

Referring to FIG. 9, impulse body control arm 12 is keyed to impulse body 7 and pivots in the impulse driven plate aperture 26 as shown on FIG. 6. Impulse body control arm is connected to the steering mechanism of the vehicle. Movement of the impulse body control arm 12 changes the impulse vector angle 52 of the impulse body 7 relative to impulse drive plate 1. This angular movement changes the induced motion vector 42 relative to impulse drive plate 1, allowing directional control of forces.

The particular embodiment of the invention herein described, which is but one of several ways that the counter rotating circular capture plates in which the inertial thrust masses are contained and are radially accelerated by a ramp to produce the desired thrust can be configured.

What is claimed is:

1. A propulsion device for creating linear motion by applying a fixed mechanical interference into the path of counter-rotating inertia thrust masses that translates energy to an impulse drive plate by absorbing a portion of the kinetic energy as the momentum of the rotating thrust masses is diverted by the fixed mechanical interference, within a system, which comprises; a plurality of capture plates having a plurality of capture slots equidistantly spaced about the periphery of the capture plates; a plurality of capture plate gears; an impulse drive plate having an first side and a second side, with the plurality of capture plates being mounted on the first side of the impulse drive plate and the plurality of capture plate gears being mounted to the second side of the impulse drive plate, the plurality of capture plates in rotational communication with the plurality of capture plate gears by way of a pair of capture plate shafts; a plurality of inertial thrust masses positioned within corresponding capture slots of the plurality of capture plates; an impulse body being mounted to the first side of the impulse drive plate and spaced from the plurality of capture plates, the impulse body having a plurality of impulse ramps sized for placement between the plurality of capture plates for engagement of the plurality of inertia thrust masses positioned within the capture slots of the capture plates; and wherein a rotating of the plurality of capture plate gears will in turn rotate the plurality of capture plate shafts to cause rotation of the capture plates for clockwise and counter-clockwise rotation of the plurality of inertial thrust masses within the capture slots with the rotating plurality of inertial thrust masses making contact with the impulse ramps.

2. The propulsion device as set forth in claim 1, wherein the plurality of capture plates include a pair of counter-clockwise capture plates and a pair of clockwise capture plates, with the pair of counter-clockwise capture plates being a lower counter-clockwise capture plate and an upper counter-clockwise capture plate, and the pair of clockwise capture plates being a lower clockwise capture plate and an upper clockwise capture plate.

3. The propulsion device as set forth in claim 2, wherein lower counter-clockwise capture plate and the upper counter-clockwise capture plate include a counter-clockwise capture plate shaft that drives the rotation of the lower and upper counter-clockwise capture plates.

4. The propulsion device as set forth in claim 2, wherein the lower clockwise capture plate and an upper clockwise capture plate include a clockwise capture plate shaft that drives the rotation of the lower and upper clockwise capture plates.

5. The propulsion device as set forth in claim 2, wherein the plurality of capture plate gears includes a motor drive gear, a tandem intermediate drive gear, a tandem reversing gear, a clockwise capture plate gear, and counter-clockwise capture plate gear.

6. The propulsion device as set forth in claim 5, wherein the tandem intermediate drive gear has an upper gear part and a lower gear part; the upper gear part meshes with the tandem reversing gear which meshes with the counter-clockwise capture plate gear which is connected to one of the pair of capture plate shafts for rotation of the lower counter-clockwise capture plate and the upper counter-clockwise capture plate; and the lower gear part meshes with clockwise capture plate gear which is connected to another of the pair of capture plate shafts for rotation of the lower clockwise capture plate and the upper clockwise capture plate.

7. The propulsion device as set forth in claim 1, wherein the impulse body further includes at least two pulleys, with one of the pulleys connected to a ramp position motor drive shaft and the other pulley is connected to a ramp position screw shaft; a drive belt is used to transfer rotational motion from the one pulley connected to the ramp position motor drive shaft to the other pulley connected to the ramp position screw shaft; and the rotational motion causes a ramp position screw to be driven fore and aft for movement of the impulse body thereby changing the position of the impulse ramps between the plurality of capture plates.

8. The propulsion device as set forth in claim 7, wherein the ramp position motor drive shaft is connected to a ramp position motor which is mounted onto the impulse body for control of fore and aft movement of the plurality of impulse ramps between the plurality of capture plates.

9. The propulsion device as set forth in claim 1, further including a motor for controlling movement of the plurality of capture plate gears, the motor is powered by activating a power supply of a vehicle having the impulse drive plate mounted thereon, the motor is mounted to the first side of the impulse drive plate.

10. A propulsion system for converting inertial and rotational energy into linear motion, which comprises; a pair of counter-clockwise capture plates and a pair of clockwise capture plates, with each of the pair of capture plates having a plurality of capture slots equidistantly spaced from the periphery of each of the pair of capture plates; a plurality of capture plate gears; an impulse drive plate having a first side and a second side, with the pair of counter-clockwise capture plates and the pair of clockwise capture plates being mounted on the first side of the impulse drive plate and the plurality of capture plate gears being mounted to the second side of the impulse drive plate, the pair of counter-clockwise capture plates and the pair of clockwise capture plates in rotational communication with the plurality of capture plate gears by way of a counter-clockwise capture plate shaft and a clockwise capture plate shaft; a plurality of inertial thrust masses positioned within corresponding capture slots of the pair of counter-clockwise capture plates and the pair of clockwise capture plates; an impulse body mounted to the first side of the impulse drive plate and spaced from the pair of counter-clockwise capture plates and the pair of clockwise capture plates, the impulse body having a pair of impulse ramps with one of the impulse ramps placed between the counter-clockwise capture plate and another of the impulse ramps placed between the clockwise capture plate, and each of the pair of impulse ramps is positioned for controlled engagement of the plurality of inertia thrust masses positioned within the capture slots of the pair of counter-clockwise capture plates and the pair of clockwise capture plates; a ramp position motor mounted onto the impulse body for control of fore and aft movement of the pair of impulse ramps between the pair of counter-clockwise capture plates and the pair of clockwise capture plates; a motor for controlling movement of the plurality of capture plate gears is mounted to the first side of the impulse drive plate; and wherein activation of the motor is by activating a vehicle's power supply causes the rotation of the plurality of capture plate gears which in turn rotate the counter-clockwise capture plate shaft and the clockwise capture plate shaft to cause rotation of the capture plates for clockwise and counter-clockwise rotation of the plurality of inertial thrust masses within the capture slots.

11. The propulsion system as set forth in claim 1, wherein the pair of counter-clockwise capture plates being a lower counter-clockwise capture plate and an upper counter-clockwise capture plate, and the pair of clockwise capture plates being a lower clockwise capture plate and an upper clockwise capture plate.

12. The propulsion system as set forth in claim 11, wherein the counter-clockwise capture shaft drives the rotation of the lower and upper counter clockwise capture plates.

13. The propulsion system as set forth in claim 1, wherein the clockwise capture plate shaft drives the rotation of the lower clockwise capture plate and an upper clockwise capture plate.

14. The propulsion system as set forth in claim 10, wherein the plurality of capture plate gears includes a motor drive gear, a tandem intermediate drive gear, a tandem reversing gear, a clockwise capture plate gear, and counter-clockwise capture plate gear.

15. The propulsion system as set forth in claim 14, wherein the tandem intermediate drive gear has an upper gear part and a lower gear part; the upper gear part meshes with the tandem reversing gear which meshes with the counter-clockwise capture plate gear which is connected to one of the pair of capture plate shafts for rotation of the lower counter-clockwise capture plate and the upper counter-clockwise capture plate; and the lower gear part meshes with clockwise capture plate gear which is connected to another of the pair of capture plate shafts for rotation of the lower clockwise capture plate and the upper clockwise capture plate.

16. The propulsion system as set forth in claim 10, wherein the impulse body further includes at least two pulleys, with one of the pulleys connected to a ramp position motor drive shaft of the ramp position motor and the other pulley is connected to a ramp position screw shaft; a drive belt is used to transfer rotational motion from the one pulley connected to the ramp position motor drive shaft to the other pulley connected to the ramp position screw shaft; and the rotational motion causes a ramp position screw to be driven fore and aft for movement of the impulse body thereby changing the position of the impulse ramps between the plurality of capture plates.

* * * * *